United States Patent [19]

Ismert

[11] 4,260,123
[45] Apr. 7, 1981

[54] TUBING HANGER

[76] Inventor: Joseph P. Ismert, 4000 Main St., Box 282, Grandview, Mo. 64030

[21] Appl. No.: 96,817

[22] Filed: Nov. 23, 1979

[51] Int. Cl.³ ............................................ F16L 3/08
[52] U.S. Cl. ........................... 248/74 R; 174/166 R; 248/71
[58] Field of Search .................. 248/74 R, 73, 74 A, 248/74 B, 74 PB, 316 R, 316 D, 71; 24/16 PB, 73 CC, 73 SA, 73 PB, 81 CC, 249 R, 248 B, 252 R, 248 R; 211/89; 174/166

[56] References Cited

U.S. PATENT DOCUMENTS

| | | | |
|---|---|---|---|
| 1,218,181 | 3/1917 | Homer | 248/71 UX |
| 2,447,251 | 8/1948 | Hvette | 174/166 R |
| 2,570,957 | 10/1951 | Lee | 248/71 |
| 3,154,281 | 10/1964 | Frank | 248/201 |
| 3,199,818 | 8/1965 | Ahara | 248/156 |
| 3,241,797 | 3/1966 | Anderson | 248/71 |
| 3,253,084 | 5/1966 | Taylor | 174/52 |
| 3,430,903 | 3/1969 | Mathes | 248/68 R |
| 3,498,575 | 3/1940 | Downing | 248/71 |
| 3,576,304 | 4/1971 | Gillemont | 248/54 |
| 3,684,223 | 8/1972 | Logsdon | 24/73 SA X |
| 3,802,655 | 4/1974 | Schuplin | 248/74 R |
| 4,003,175 | 1/1977 | Patry | 85/21 X |
| 4,037,810 | 7/1977 | Pate | 248/74 PB X |
| 4,136,848 | 1/1949 | McCollum | 248/316 R |
| 4,148,113 | 4/1979 | Dvorachek | 248/74 PB X |

FOREIGN PATENT DOCUMENTS 1230280 9/1960 France .................................. 248/73
150603 7/1955 Sweden ............................. 248/74 PB

*Primary Examiner*—J. Franklin Foss
*Attorney, Agent, or Firm*—Fishburn, Gold and Litman

[57] ABSTRACT

A tube hanger for supporting a tube and the like from a mounting surface comprises a unitary body of elastomeric material having a base of generally rectangular shape with resilient arms extending outwardly of the base and arcing to converge in opposed relation. The arms have respective spaced tip ends whereby a partially enclosed cavity sized for receipt of a tube is defined in coordination with the base which has a lateral entrance thereinto between the tip ends for receiving and retaining the tube within the cavity. A plurality of lugs extend radially inward from the arms and are arranged around the cavity for compressibly gripping a tube within the hanger cavity. A notch or opening is formed within the base at an intermediate portion thereof at the root junction of the arms and divides the base into first and second base portions, the notch or opening being open to the hanger cavity. The tube hanger is secured to a mounting surface by means of a nail which has a shank with a plurality of lugs thereon and an enlarged head that compresses the first and second base portions together about the notch or opening and pulls the arms inwardly around the tube with a secure, supportive grip thereon.

7 Claims, 5 Drawing Figures

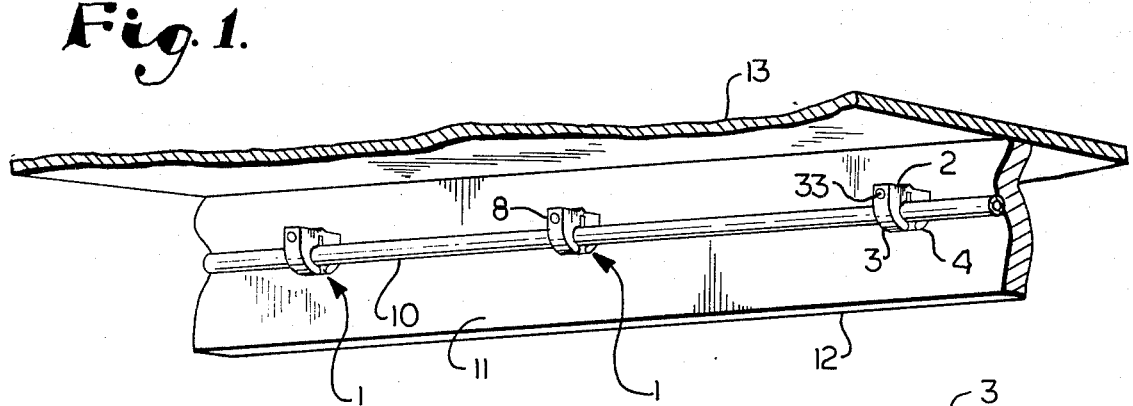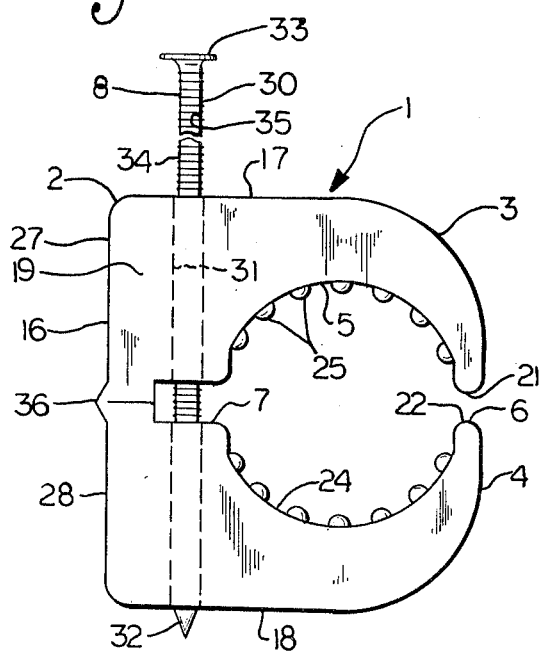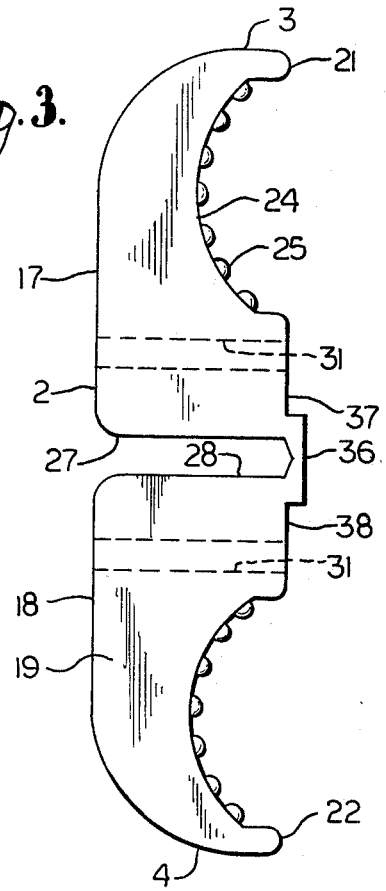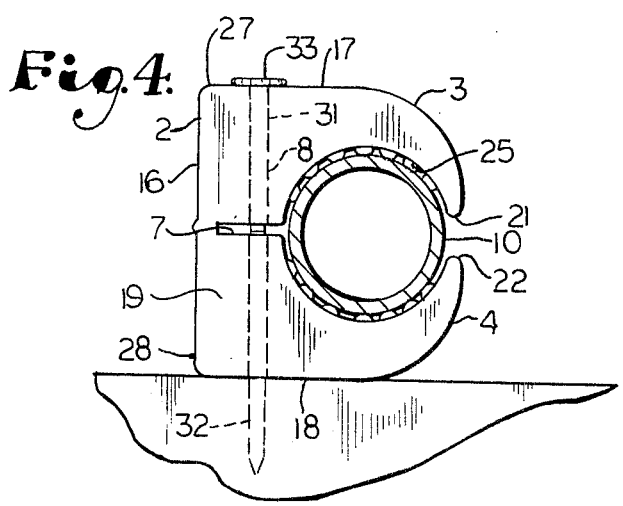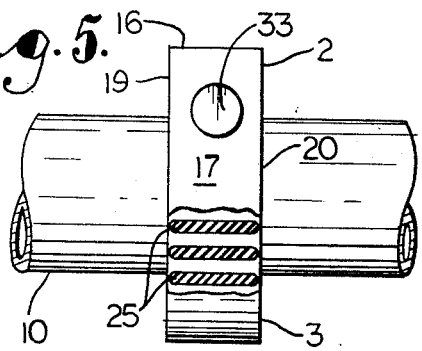

TUBING HANGER

This invention relates to hangers for supporting tubular objects such as pipes and the like and particularly to such hangers for securely gripping and supporting said tubular objects in a fixed yet shock mounted relationship to a supportive surface.

Tubing or pipes must be affixed to and supported from mounting surfaces for runs of pipe from one location to another. Where such pipes are used for transporting liquid material, such as water, opening and closings of valves or faucets can create a vibration, knocking or the like in the pipe as shock pressures are conducted through the liquid. This "water hammer" tends to cause movement of the tubing or pipe. Additionally, such tubing or pipes are subject to expansion and contraction, as when periodically transporting hot water, thereby also causing movement of the pipe. Mountings supporting the pipe or tubing tend to be loosened or weakened by the movement of the pipe relative to a structural support member and may ultimately cease to properly support the pipe. In other instances, the mounting too tightly restricts movement of pipe and the pipe is not free to flex relative thereto, resulting in localized metal fatigue, weakened joints and the like.

The principal objects of the present invention are: to provide a pipe or tube hanger for supporting a tube or the like from a mounting surface; to provide such a tube hanger which prevents excessive movement of a tube or pipe relative to the mounting surface while permitting slight amounts of movement; to provide such a tube hanger which isolates the mounting surface from vibration or knocking within the tube or pipe; to provide such a tube hanger having a plurality of lugs to facilitate the grip of the hanger on the pipe or tube; to provide such a tube hanger which is resistant to loosening and the like; and to provide such a tube hanger which is relatively inexpensive, highly reliable in use and well adapted for its intended purpose.

Other objects and advantages of this invention will become apparent from the following description taken in connection with the accompanying drawings wherein are set forth by way of illustration and example, a certain embodiment of this invention.

FIG. 1 is a perspective view illustrating a plurality of tube hangers embodying this invention and supporting a pipe or tube from a support member.

FIG. 2 is a plan view of the tube hanger.

FIG. 3 is a plan view of the tube hanger and showing a manner of making same.

FIG. 4 is a plan view of the tube hanger shown in use to mount a tube or pipe from a supportive structure.

FIG. 5 is a fragmentary end elevational view of the tube hanger with a tube or pipe supported therein.

As required, a detailed embodiment of the present invention is disclosed herein, however, it is to be understood that the disclosed embodiment is merely exemplary of the invention which may be embodied in various forms. Therefore, specific, functional and structural details disclosed herein are not to be interpreted as limiting, but merely as a basis for the claims and as a representative basis for teaching one skilled in the art to variously employ the present invention in virtually any appropriately detailed structure.

Referring more in detail to the drawings:

The reference numeral 1 generally indicates a pipe or tube hanger embodying the present invention and comprising a body of resilient material having a base 2 and opposite arms 3 and 4 extended outwardly from the base 2 and converging to form a partially enclosed cavity 5 in coordination with the base 2 sized for receipt of a tube and having a lateral entrance 6 between the arms 3 and 4 for receiving and retaining a pipe or tube within the cavity 5. The body includes an intermediate opening 7 positioned generally at the root juncture of the arms 3 and 4 and preferably, a nail 8 having projections on the shank thereof is extended through the base 2 and through the opening 7 to draw the arms 3 and 4 tightly together and exert a secure supportive grip on a pipe within the cavity 5.

A plurality of pipe or tube hangers 1 are shown in FIG. 1 which illustrates an exemplary environment for the use thereof. Therein,, the tube hangers 1 mount a elongate pipe or tube 10 to a mounting or supportive surface 11 such as a floor joist 12 supporting a floor structure 13. The body of the tube hanger 1 is preferably comprised of a cured elastomeric plastic resin such as polyprophylene or polyethylene suitable for molding operations and the like to provide a resilient tube hanger which grips and supports the pipe or tube 10 therein and acts as a shock mount to support the tube from the joist 12 and isolate the joist from vibration, shocks, and the like. Preferably the elastomeric material has sufficient strength and structural rigidity to support the weight of the pipe or tube 10 and yet is sufficiently resilient for compression of the base 2 as described below.

The tube hanger 1 has a unitary body of which the base 2 is generally of rectangular shape and has a side wall 16, opposite end walls 17 and 18 spaced, parallel surfaces 19 and 20 therebetween which form a relatively thin or narrow tube hanger 1, FIG. 5. Resilient, opposite arms 3 and 4 extend outwardly of the base 2 in arcs from the opposite end walls 17 and 18 and converge in opposed relation. The arms 3 and 4 generally comprise semi-circular segments and have respective spaced tip ends 21 and 22 and in coordination with the base 2 define the partially enclosed cavity 5 which is sized for accommodation of the pipe or tube 10 therein. The lateral entrance 6 between the tip ends 21 and 22 provides a passage into and out of the cavity 5 for the pipe or tube 10.

Arm inner surfaces 24 extend around the cavity 5 and have a plurality of ridge-like lugs 25 protruding radially inward toward the cavity 5 and which have an elongate direction oriented in line with the longitudinal direction of the pipe or tube 10 or transversely and fully between the surfaces 19 and 20, FIG. 5. The lugs 25 are preferably integrally formed with the base 2 and the arms 3 and 4 and are accordingly of elastomeric material to compressibly grip the exterior surface of the pipe or tube 10 held between the arms 3 and 4, FIG. 4.

The intermediate opening 7 is formed generally at the root juncture of the arms 3 and 4 and, in the illustrated example, is generally rectangular in shape and is open to the cavity 5. The opening 7 forms a notch in the base 2 and divides the base into first and second base portions 27 and 28 which are drawn together longitduinally to substantially lessen or close the opening 7 when the tube hanger 1 is mounted as described below. As the opening 7 is reduced, the arms 3 and 4 tend to arc toward each other, rather than spreading apart, thereby facilitating retention of the tube or pipe 10. The arms 3 and 4 tend to arc together about a center or pivot point located generally within the opening 7 and adjacent the portion of the nail shank 34 extending through the opening.

A fastener 30, such as the ring shank nail 8 extends through the base 2 and, in the illustrated example, is received at least partway in a bore or nailway 31 extending through the base portions 27 and 28 and accordingly has first and second portions aligned coaxially for passage of the fastener 30 through the nailway portions in the first and second base portions 27 and 28 and through the opening 7.

The nail 8 extends through the nailway 31 and has a point 32 at one end thereof, an enlarged head 33 at the other end thereof and a shank 34 therebetween. The shank 34 has a plurality of projections such as ridge-like rings 35 extending therearound and which engage with the interior wall of the bore or nailway 31 and tightly engage the joist 12 to inhibit loosening of the nail.

In the manufacture of the body of the tube hanger 1 including the base 2 and the arms 3 and 4, the body is preferably molded of the elastomeric plastic resin such as polyprophylene or polyethylene as described above. The arms 3 and 4 and first and second base portions 27 and 28 spread outwardly of each other and are joined about a central portion 36, FIG. 3. Step portions 37 and 38 are formed on opposite sides of the central portion 36 which, when the arms 3 and 4 and base portions 27 and 28 are swung together about the central portion 36, FIG. 2, combine to form the opening 7.

In the employment of this invention, the user selects a tube hanger 1 of a correct size for the pipe or tube 10 to be suspended and, holding the tube hanger 1, fits the arms 3 and 4 around the pipe or tube 10. The hanger 1 is then rotated until the point of the nail 8 is against the surface to which the tube hanger 1 is to be fastened, FIGS. 1 and 4.

The nail is driven with a hammer or the like into the joist 12 and the nail head 33 presses against the end wall 17 and pulls the arm 3 and the first base portion 27 in the direction of nailing respectively toward the arm 4 and the second base portion 28, thereby drawing the arms 3 and 4 and the base portions 27 and 28 together and reducing or even closing the opening 7, FIG. 4. The arms 3 and 4 are drawn together about the pipe or tube 10, thereby compressing and flattening the lugs 25 and retaining the pipe or tube 10 with a secure, supporting grip with substantially equal gripping forces applied by each of the arms 3 and 4. So retained, the pipe or tube 10 is supported adjacent the mounting or supporting surface 11 and the latter is isolated therefrom against vibration, shocks and movement due to expansion and contraction of the pipe or tube.

It is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. A tube hanger for supporting a tube and the like from a mounting surface and comprising:
   (a) a tube hanger of elastomeric material having a base;
   (b) resilient, opposite first and second arms having respective spaced tip ends and extending outwardly from said base in semi-circular arc segments and converging to define a partially enclosed, substantially circular cavity in coordination with said base, said cavity being sized for receipt of a tube and having a lateral entrance thereinto between said tip ends, one of said arms being adapted for engagement with a mounting surface;
   (c) an opening in said base intermediately of said arms and dividing said base into first and second base portions respectively, having said first and second arms extended therefrom and having a hinge means extending therebetween and flexibly connecting said first and second base portions for spreading said first and second base portions and said opposed arms apart and positioning same about the tube, said hinge means being spaced from said cavity and said opening communicating with said cavity; and
   (d) a fastener extending at least partially through said base and for extension through said opening between said base portions; said fastener having an end for engagement with the mounting surface, a shank with a plurality of projections thereon and an enlarged head at a second end thereof whereby when said tube hanger is affixed to the mounting surface, said enlarge head compresses said base and squeezes the base portions together and pulls said arms tightly about said tube in a secure, supporting grip.

2. The tube hanger set forth in claim 1 wherein:
   (a) said opening is open to said cavity and, when said tube hanger is affixed to said mounting surface, said first base portion is pulled toward said second base portion by the engagement of said projections with said first base portion and squeezes said arms together.

3. The tube hanger set forth in claim 2 wherein:
   (a) said projections include ridge-like rings; and
   (b) said fastener is a ring-shank nail.

4. The tube hanger set forth in claim 1 including:
   (a) a plurality of lugs extending around said arms and protruding into said cavity, said lugs being of elastomeric material for gripping a tube within said cavity.

5. The tube hanger set forth in claim 1 wherein:
   (a) said base has a side wall, opposite endwalls, one of which is adapted for engagement with a mounting surface, and spaced surfaces between said endwalls for extending generally away from the mounting surface.

6. The tube hanger set forth in claim 1 wherein:
   (a) said base has a nailway having an interior wall extending between said opposite endwalls, through said first and second base portions and through said opening; and
   (b) said fastener is a nail extending through said nailway and sized for engagement with at least a portion of the interior wall thereof and tending to pull said first base portion therewith toward said second base portion as said nail is driven into said mounting surface.

7. A tube hanger for supporting a tube and the like from a mounting surface and comprising:
   (a) a unitary tube hanger of elastomeric material having a base of generally narrow, rectangular shape with a sidewall, opposite endwalls and parallel surfaces therebetween;
   (b) resilient, opposite arms of substantially equal length extending outwardly of said base from a root juncture therewith, each of said arms extending in semi-circular arc segments from the opposite endwalls and converging in opposed relation and having respective spaced tip ends, said arms in coordination with said base defining a partially enclosed, substantially circular cavity sized for support of a tube and having a lateral entrance thereinto between said tip ends;

(c) a plurality of elongate lugs extending radially inward from said arms and generally between said opposite parallel surfaces and arranged around said cavity, said lugs being of said elastomeric material for gripping a tube within said cavity and allowing flow of air therearound;

(d) an opening in said base at an intermediate portion thereof at the root juncture of said arms and dividing said base into first and second base portions, of substantially equal size and having a hinge means extending therebetween and flexibly connecting said first and second base portions for spreading said first and second base portions and said opposed arms apart and positioning same about the tube, said hinge means adjoining said sidewall, said opening communicating with said cavity;

(e) A nailway having an interior wall and extending between said opposite endwalls, aligned through said first and second base portions, and through said opening; and (f) a fastening nail having a point at one end and an enlarged head at the other end and with a shank therebetween having a plurality of ridge-like rings therearound for engaging at least a portion of said interior wall and for retention therewith whereby when said tube hanger is nailed to the mounting surface, said enlarged head compresses said base and squeezes the first and second base portions toward each other about said opening and pulls said arms tightly about said tube in a secure, supporting grip.

* * * * *